United States Patent
Jin

(10) Patent No.: US 9,490,718 B2
(45) Date of Patent: Nov. 8, 2016

(54) MULTIPLE OUTPUT SYNCHRONOUS POWER CONVERTER

(71) Applicant: Microsemi Corporation, Aliso Viejo, CA (US)

(72) Inventor: Xiaoping Jin, Orange, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 162 days.

(21) Appl. No.: 14/559,135

(22) Filed: Dec. 3, 2014

(65) Prior Publication Data

US 2015/0188440 A1     Jul. 2, 2015

Related U.S. Application Data

(63) Continuation-in-part of application No. 14/296,544, filed on Jun. 5, 2014, now Pat. No. 9,018,852, which is a continuation of application No. 13/279,445, filed on Oct. 24, 2011, now Pat. No. 8,779,686.

(60) Provisional application No. 61/910,975, filed on Dec. 3, 2013, provisional application No. 61/406,136, filed on Oct. 24, 2010.

(51) Int. Cl.
*H02M 3/335*     (2006.01)
*H05B 33/08*     (2006.01)

(52) U.S. Cl.
CPC ..... *H02M 3/33561* (2013.01); *H05B 33/0815* (2013.01); *H05B 33/0827* (2013.01); *Y02B 20/346* (2013.01)

(58) Field of Classification Search
CPC ....... H05B 41/36; H05B 41/24; H05B 37/02
USPC ............ 315/291, 307, 209 R, 219, 246, 221, 315/223, 244, 241 R, 242, 243, 276
See application file for complete search history.

(56) References Cited

U.S. PATENT DOCUMENTS 6,075,295 A     6/2000  Li
6,297,970 B2   10/2001  Hemena et al.
(Continued)

FOREIGN PATENT DOCUMENTS

| | | |
|---|---|---|
| EP | 2262086 A1 | 12/2010 |
| IN | 964/KOL/2009 | 1/2011 |
| KR | 2008-0073173 A | 8/2008 |

OTHER PUBLICATIONS

Ma, Ki, Tsui and Mok; "Single-Inductor Multiple-Output Switching Converters With Time-Multiplexing Control in Discontinuous Conduction Mode"; IEEE Journal of Solid State Circuits, vol. 28, No. 1, Jan. 2003; IEEE, New York.

(Continued)

*Primary Examiner* — Minh D A
(74) *Attorney, Agent, or Firm* — Simon Kahn

(57) ABSTRACT

A multiple output power converter constituted of: an inductance element arranged, responsive to a switching circuit to receive power and arranged to output a function of the received power for a predetermined time period, the secondary side exhibiting a predetermined voltage during the predetermined time period; a control circuitry arranged to switch the switching circuit so as to maintain a first output at a predetermined level; a second output; and an electronically controlled switch arranged to be alternately in a closed state and an open state, the second output arranged to receive or not receive a portion of the output power responsive to the state, the switch set in synchronization with the switching circuit.

12 Claims, 11 Drawing Sheets

(56) References Cited

U.S. PATENT DOCUMENTS

| | | |
|---|---|---|
| 6,459,595 B2 | 10/2002 | Assow |
| 7,432,661 B2 * | 10/2008 | Taipale .............. H05B 41/282 315/209 R |
| 7,679,937 B2 | 3/2010 | Wingrove et al. |
| 7,923,943 B2 | 4/2011 | Peker |
| 2004/0135562 A1 | 7/2004 | Oden |
| 2005/0264271 A1 | 12/2005 | Lam et al. |
| 2007/0040516 A1 * | 2/2007 | Chen ................... H05B 39/045 315/291 |
| 2011/0310639 A1 | 12/2011 | Hsu |
| 2012/0286576 A1 | 11/2012 | Jing et al. |

OTHER PUBLICATIONS

Ki and Ma; "Single-Inductor Multiple-Output Switching Converters"; Power Electronics Specialists Conference, 2001, pp. 226-231; published 2001 by IEEE, New York.

European Power Supply Manufacturers Association, "Harmonic Current Emissions" dated Nov. 2010; published at www.epsma.org.

Havanur, S.; "Combining Synchronous Rectification and Post Regulation for Multiple Isolated Outputs"; Applied Power Electronics Conference and Exposition, 2004; vol. 2, pp. 872-877; published 2004 by IEEE, New York.

* cited by examiner

| | |
|---|---|
| 1000 | SWITCH SWITCHING CIRCUIT BETWEEN PLURALITY OF STATES, PROVIDE POWER TO PRIMARY SIDE OF INDUCTANCE ELEMENT RESPONSIVE TO FIRST STATE AND NOT PROVIDE POWER TO PRIMARY SIDE RESPONSIVE TO SECOND STATE |
| 1010 | RESPONSIVE TO RECEIVED POWER, OUTPUT AT SECONDARY SIDE A FUNCTION OF RECEIVED POWER |
| 1020 | MAINTAIN PREDETERMINED VOLTAGE LEVEL AT FIRST NON-SWITCHABLE OUTPUT RESPONSIVE TO SWITCHING |
| 1030 | ALTERNATELY SWITCH FIRST SWITCH BETWEEN CLOSED STATE AND OPEN STATE, PROVIDE POWER TO SECOND OUTPUT RESPONSIVE TO FIRST STATE AND NOT PROVIDE POWER TO SECOND OUTPUT RESPONSIVE TO SECOND STATE; FIRST SWITCH SWITCHING IN SYNCH. WITH SWITCHING CIRCUIT SWITCHING, POWER PROVIDED TO SECOND OUTPUT FOR LESS TIME THAN POWER FUNCTION OUTPUT AT SECONDARY SIDE |
| 1040 | (OPT.) SYNCH. ONE OF TRAILING EDGE AND LEADING EDGE MODULATION |
| 1050 | (OPT.) INDUCTOR NOT COUPLED BETWEEN SECOND OUTPUT AND INDUCTANCE ELEMENT SECONDARY SIDE |
| 1060 | (OPT.) ALTERNATELY SWITCH SECOND SWITCH BETWEEN CLOSED STATE AND OPEN STATE, PROVIDE POWER TO THIRD OUTPUT RESPONSIVE TO FIRST STATE AND NOT PROVIDE POWER TO THIRD OUTPUT RESPONSIVE TO SECOND STATE; SECOND SWITCH SWITCHING IN SYNCH. WITH SWITCHING CIRCUIT SWITCHING, POWER PROVIDED TO THIRD OUTPUT FOR LESS TIME THAN POWER FUNCTION OUTPUT AT SECONDARY SIDE |
| 1070 | (OPT.) DUTY CYCLE OF SECOND SWITCH < DUTY CYCLE OF FIRST SWITCH |
| 1080 | (OPT.) INDUCTANCE ELEMENT COMPRISES ONE OF: A TRANSFORMER, THE PRIMARY SIDE COMPRISES PRIMARY WINDING AND SECONDARY SIDE COMPRISING PLURALITY OF SECONDARY WINDINGS; AND AN INDUCTOR, PRIMARY SIDE COMPRISING FIRST END AND SECONDARY SIDE COMPRISING SECOND OPPOSING END |

MULTIPLE OUTPUT SYNCHRONOUS POWER CONVERTER

CROSS REFERENCE TO RELATED APPLICATIONS

This application claims priority from: U.S. Provisional Patent Application Ser. No. 61/910,975 filed Dec. 3, 2013 entitled "HIGH EFFICIENCY POWER CONVERTER WITH SYNCHRONOUS REGULATION CONTROL", the entire contents of which are incorporated herein by reference. This application is additionally a continuation-in-part of application Ser. No. 14/296,544 filed Jun. 5, 2014, which is a continuation of application Ser. No. 13/279,445 filed Oct. 24, 2011, which issued as U.S. Pat. No. 8,779,686 Jul. 15, 2014, and which claims benefit of provisional application 61/406,136 filed Oct. 24, 2010.

TECHNICAL FIELD

The present invention relates to the field of power converters, and in particular to a synchronously switched multiple output DC-DC power converter.

BACKGROUND OF THE INVENTION

In power conversion applications, when an input power needs to be converted and transmitted over an insulation barrier to produce multiple regulated DC outputs, a cost-effective method known to the prior art is to employ a common primary switching stage to provide a switched signal to a primary side winding of a power transformer and derive multiple DC outputs from respective multiple secondary side windings. In such an approach, normally one of the DC outputs is regulated by feedback control of the primary side switching operation, while non-isolated DC to DC regulation stages are deployed for each of the remaining DC outputs, when relatively accurate voltages are required for those outputs. Alternatively, the primary side power stage can operate at a predetermined switching condition in an open loop manner, and all the DC outputs may be regulated with dedicated DC to DC post regulators.

FIG. 1 illustrates a high level schematic diagram of a multiple output power converter 10, according to the prior art. Multiple output power converter 10 comprises: a primary side control circuitry 30; a switching circuit 40, comprising an electronically controlled switch SB1 and an electronically controlled switch SB2; a primary side capacitance element CP; a transformer 50, exhibiting a primary winding 60 and a pair of secondary windings 70 and 80, magnetically coupled to primary winding 60; a pair of unidirectional electronic valves D1; a pair of unidirectional electronic valves D2; a unidirectional electronic valve D3; a unidirectional electronic valve D4; a plurality of capacitance elements C1, C2, C3 and C4; a pair of inductance elements L1 and L2; a pair of electronically controlled switches S1 and S2; a secondary side control circuitry 85; a voltage divider 90; and a reference voltage source 100.

In one embodiment, each of electronically controlled switches SB1, SB2, S1 and S2 is implemented as an n-channel field-effect-transistor (NFET), and is described herein as such. In another embodiment, each of primary side capacitance element CP and capacitance elements C1, C2, C3 and C4 is implemented as a capacitor, and is described herein as such. In one embodiment, each of pair of unidirectional electronic valves D1, pair of unidirectional electronic valves D2 and unidirectional electronic valves D3 and D4 is implemented as a diode, and is described herein as such. In another embodiment, each of inductance elements L1 and L2 is implemented as an inductor and is described herein as such. Switching circuit 40 is illustrated and described herein as comprising a half bridge circuit, however this is not meant to be limiting in any way and any appropriate type of switching circuit for providing power to primary winding 60 may be provided, including, but not limited to, a full bridge circuit, a push-pull circuit, a flyback converter circuit and a forward converter circuit.

The drain of NFET SB1 is coupled to a power terminal of a power source (not shown) and the gate of NFET SB1 is coupled to a respective output of primary side control circuitry 30. The source of NFET SB1 is coupled to a first end of primary side capacitor CP and the drain of NFET SB2. A second end of primary side capacitor CP is coupled to a first end of primary winding 60 of transformer 50. A second end of primary winding 60 is coupled to the source of NFET SB2 and the return of the power source. The gate of NFET SB2 is coupled to a respective output of primary side control circuitry 30.

A first end of secondary winding 70 is coupled to the anode of a first diode D1 and a second end of secondary winding 70 is coupled to the anode of a second diode D1. The cathode of each diode D1 is coupled to a first end of voltage divider 90 and a first end of capacitor C1, at an output VO1. Output VO1 is coupled to an associated load (not shown). A second end of capacitor C1 is coupled to a common potential and a second end of voltage divider 90 is coupled to the common potential. A dividing node of voltage divider 90 is coupled to a respective input of primary side control circuitry 30 and a positive terminal of reference voltage source 100 is coupled to a respective input of primary side control circuitry 30. A return of reference voltage source 100 and a center tap of secondary winding 70 are each coupled to the common potential.

A first end of secondary winding 80 is coupled to the anode of a first diode D2 and a second end of secondary winding 80 is coupled to the anode of a second diode D2. The cathode of each diode D2 is coupled to a first end of capacitor C2 and a drain of NFET S1. The source of NFET S1 is coupled to the cathode of diode D3 and a first end of inductor L1. A second end of inductor L1 is coupled to a first end of capacitor C3 and a respective input of secondary side control circuitry 85, at an output VO2. Output VO2 is coupled to an associated load (not shown). A second end of capacitor C2, the anode of diode D3, a second end of capacitor C3 and a center tap of secondary winding 80 are each coupled to the common potential. The gate of NFET S1 is coupled to a respective output of secondary side control circuitry 85, denoted signal VG3.

Node VO1 is further coupled to a first end of inductor L2. A second end of inductor L2 is coupled to the drain of NFET S2 and the anode of diode D4. The cathode of diode D4 is coupled to a first end of capacitor C4 and a respective input of secondary side control circuitry 85, at an output VO3. Output VO3 is coupled to an associated load (not shown). The source of NFET S2 and a second end of capacitor C4 are each coupled to the common potential. The gate of NFET S2 is coupled to a respective output of secondary side control circuitry 85, denoted signal VG4.

In operation, primary side control circuitry 30 is arranged to alternately open and close NFETs SB1 and SB2 such that primary winding 60 is charged when NFET SB1 is closed and discharged when NFET SB2 is closed. In one embodiment, the duty cycle of switching circuit 40 is adjusted responsive to the voltage at output VO1 in comparison with the voltage across reference voltage source 100. In another embodiment, switching circuit 40 operates at a fixed duty cycle of near 50%, with a variable frequency, the frequency varied responsive to the voltage at output VO1 in comparison with the voltage across reference voltage source 100. When NFET SB1 is closed, and NFET SB2 is open, primary winding 60 is charging and power is output from secondary winding 70 via first diode D1. When NFET SB2 is closed, and NFET SB is open, primary winding 60 is discharging and power is output from secondary winding 70 via second diode D1. Primary side capacitor CP ensures that the alternate charging and discharging of primary winding 60 is balanced. The rectified voltage at the cathodes of diodes D1 is supplied to the load of output VO1 and is additionally divided by voltage divider 90. The divided voltage is compared to the reference voltage output by reference voltage source 100. In the event that the divided voltage is higher than the output of reference voltage source 100, primary side control circuitry 30 is arranged to either reduce the duty cycle of switching circuit 40 or increase the switching frequency of switching circuit 40, thereby reducing the amount of power supplied via secondary winding 70. In the event that the divided voltage is lower than the output of reference voltage source 100, primary side control circuitry 30 is arranged to either increase the duty cycle of switching circuit 40 or reduce the switching frequency of switching circuit 40, thereby increasing the amount of power supplied via secondary winding 70. Capacitor C1 is arranged to smooth the voltage at output VO1.

Outputs VO2 and VO3 are similarly influenced by the control of primary side control circuitry 30. Particularly, power output from secondary winding 70 is split between output VO1 and output VO2, thus an increase in the power output via secondary winding 70 will cause an increase in the voltage of output VO3. Additionally, an increase in the duty cycle of switching circuit 40, or a reduction in the switching frequency of switching circuit 40, causes an respective increase in the power output via secondary winding 80, thereby causing an increase in the voltage of output VO2. For this reason, the voltage of each of output VO2 and output VO3 is independently controlled. Particularly, the voltage of output VO2 is controlled by the buck configuration of capacitor C2, NFET S1, diode D3 and inductor L1. When NFET S1 is closed responsive to a first state of signal VG3, output VO2 receives power from secondary winding 80 and inductor L1 is charged. When NFET S1 is opened responsive to a second stage of signal VG3, inductor L1 discharges through diode D3 and output VO2. Capacitor C3 is arranged to smooth the voltage of output VO2. Secondary side control circuitry 85 is arranged to detect the voltage at output VO2 and is further arranged to adjust the duty cycle of signal VG3 applied to the gate of NFET S1 to maintain the voltage at a predetermined value. Similarly, the voltage of output VO3 is controlled by the boost configuration of NFET S2, diode D4 and inductor L2. When NFET S2 is closed responsive to a first state of signal VG4, inductor L2 is charged from secondary winding 70. When NFET S2 is opened responsive to a second stage of signal VG4, inductor L2 discharges through diode D4 and output VO3 while additionally receiving power from secondary winding 70. Capacitor C4 is arranged to smooth the voltage of output VO3. Secondary side control circuitry 85 is arranged to detect the voltage at output VO3 and is further arranged to adjust the duty cycle of signal VG4 applied to the gate of NFET S2 to adjust the voltage at a predetermined value.

As described above, each output VO2 and VO3, and any additional outputs, need to be regulated by a respective electronically controlled switch, with an accompanying respective inductor and diode. Additionally, the buck configuration of output VO2 further requires capacitor C2. Furthermore, NFETs S1, S2 exhibit significant switching losses. Particularly, the drain-source voltage of each NFET S1, S2 equals a particular value when being switched from the open state to the closed state. Switching loss occurs under such hard switching circumstances since the discharge of the NFET capacitance is purely dissipative and produces a strong discharge current spike and associated switching noise.

SUMMARY OF THE INVENTION

Accordingly, it is a principal object of the present invention to overcome at least some of the disadvantages of the prior art. This is provided in one embodiment by a multiple output power converter comprising: a control circuitry; an inductance element having a primary side and a secondary side; a switching circuit, the inductance element arranged, responsive to the switching circuit, to receive power at the primary side from a power source, and the inductance element further arranged, responsive to the received power at the primary side, to output at the secondary side a function of the received power for a predetermined time period, the secondary side exhibiting a predetermined voltage during the predetermined time period; a first output non-switchably coupled to the secondary side of the inductance element, the control circuitry arranged to switch the switching circuit so as to maintain the first output at a predetermined level; a second output, different than the first output, associated with the secondary side of the inductance element; and an electronically controlled switch, the electronically controlled switch arranged to be alternately in a closed state and an open state, responsive to the control circuitry, wherein responsive to the electronically controlled switch being in a first of the closed state and open state, the second output is arranged to receive a portion of the power output from the secondary side of the inductance element, wherein responsive to the electronically controlled switch being in a second of the closed state and open state, the second output is arranged to not receive the portion of the power output from the secondary side of the inductance element, wherein the control circuitry is arranged to alternately set the electronically controlled switch in one of the first and second of the closed state and open state in synchronization with the switching of the switching circuit, and wherein the arrangement of the control circuitry to alternately set the electronically controlled switch is such that the amount of time between the arrangement to set in the first state and the arrangement to set in the second state is less than the predetermined time period.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawing:

FIG. 6 illustrates a high level flow chart of a synchronous power conversion method, according to certain embodiments.

DETAILED DESCRIPTION OF PREFERRED EMBODIMENTS

Figure 1:
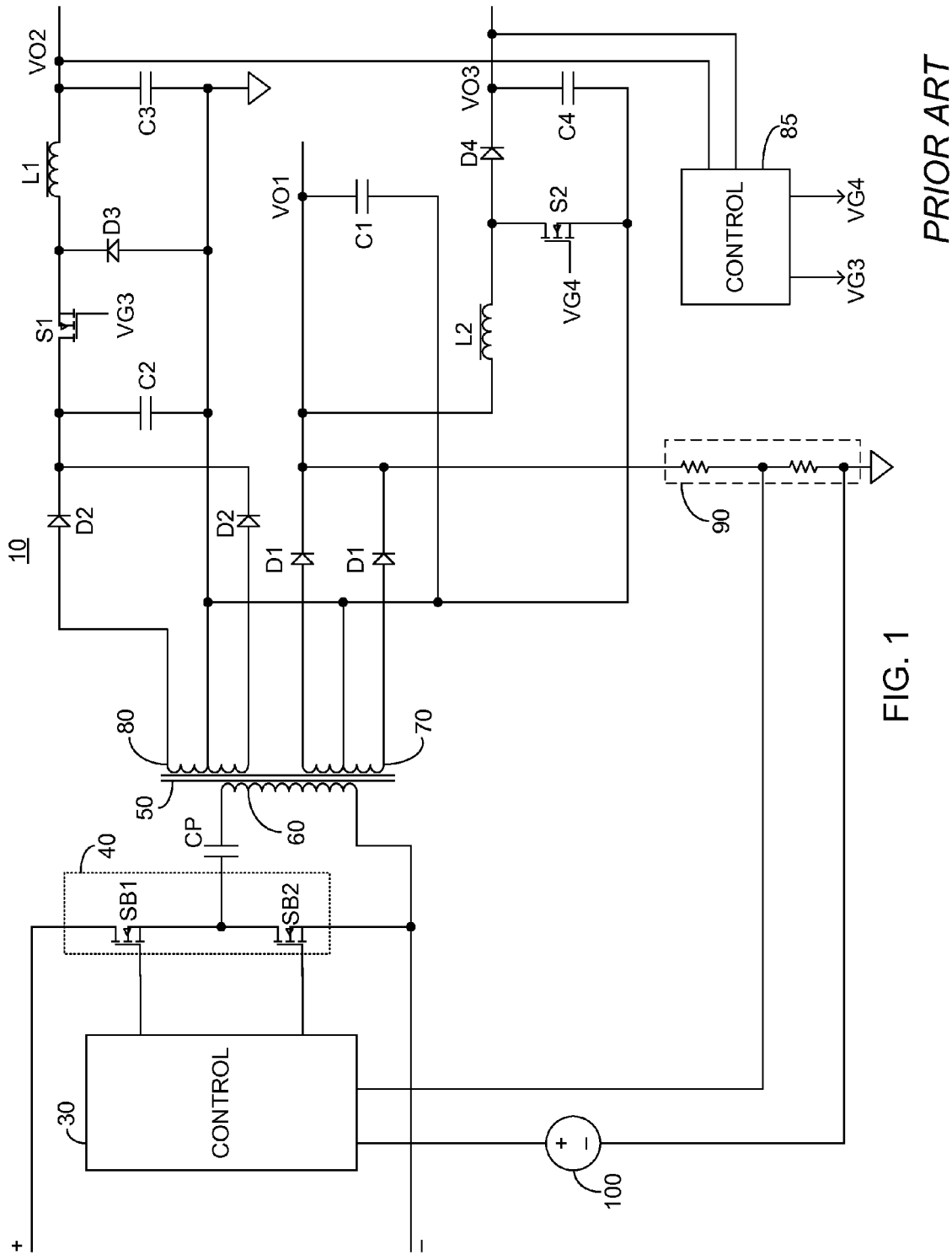
FIG. 1 illustrates a high level schematic diagram of a prior art multiple output power converter.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In particular, the term "coupled" as used herein is not meant to be limited to a direct connection, and allows for intermediary devices or components without limitation.

Figure 2A:
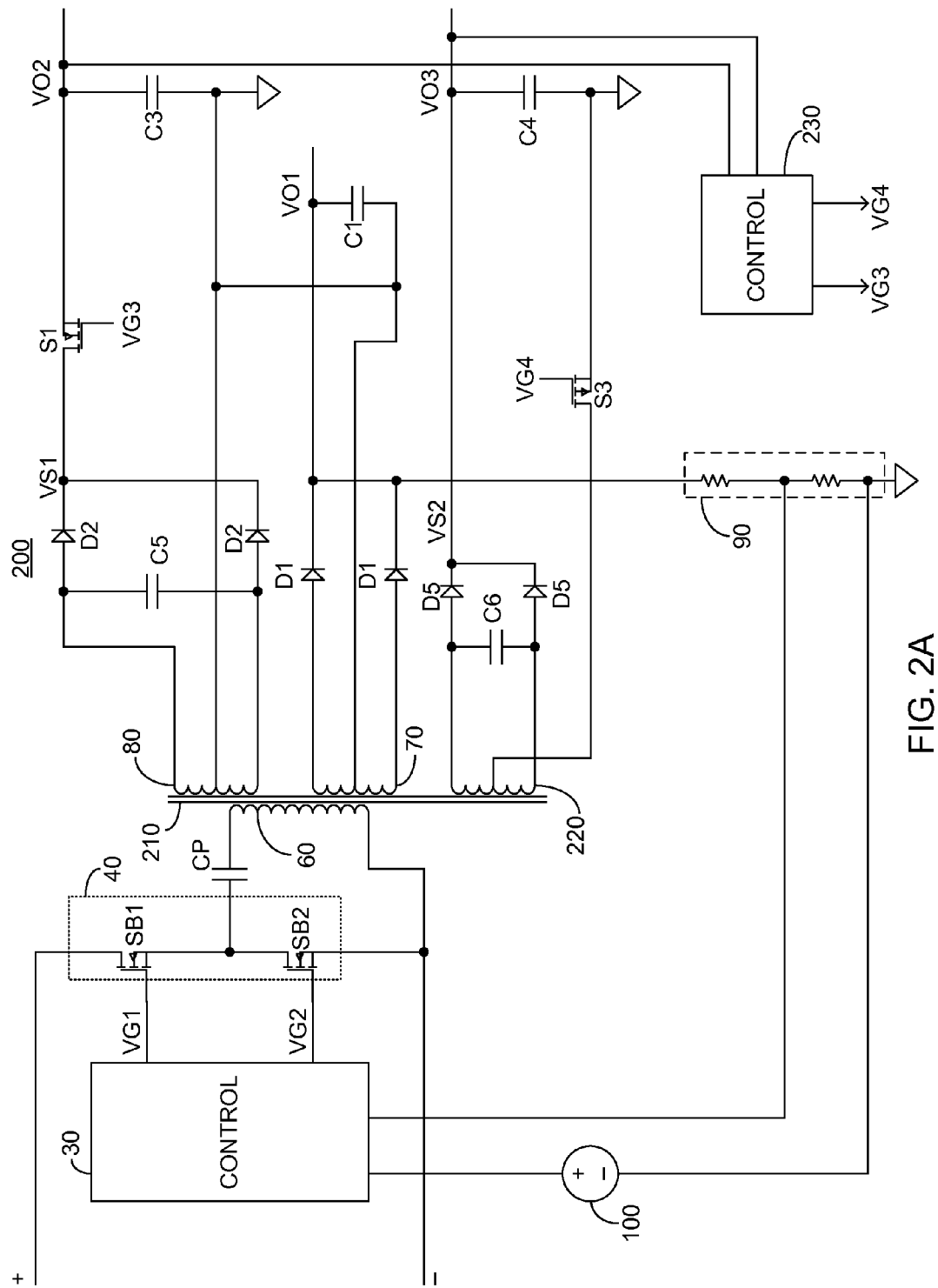
FIG. 2A illustrates a high level schematic diagram of a buck type multiple output synchronous power converter, according to certain embodiments.

FIG. 2A illustrates a high level schematic diagram of a buck type multiple output power converter 200, according to certain embodiments. Multiple output power converter 200 comprises: a primary side control circuitry 30; a switching circuit 40; a primary side capacitor CP; a transformer 210, exhibiting a primary winding 60 and a plurality of secondary windings 70, 80 and 220, each magnetically coupled to primary winding 60; a pair of diodes D1; a pair of diodes D2; a pair of unidirectional electronic valves D5; a plurality of capacitors C1, C3 and C4; a plurality of capacitance elements C5 and C6; an NFET S1; an electronically controlled switch S3; a voltage divider 90; a reference voltage source 100; and a secondary side control circuitry 230.

In one embodiment, electronically controlled switch S3 is implemented as a p-channel field-effect-transistor (PFET), and is described herein as such. In another embodiment, each of capacitance elements C5, C6 is implemented as a capacitor, and is described herein as such. In one embodiment, each of pair of unidirectional electronic valves D5 is implemented as a diode, and is described herein as such.

The drain of NFET SB1 is coupled to a power terminal of a power source (not shown) and the gate of NFET SB1 is coupled to a respective output of primary side control circuitry 30, the gate voltage thereof denoted signal VG1. The source of NFET SB1 is coupled to a first end of primary side capacitor CP and the drain of NFET SB2. A second end of primary side capacitor CP is coupled to a first end of a first end of primary winding 60 of transformer 210. A second end of primary winding 60 is coupled to the source of NFET SB2 and the return of the power source. The gate of NFET SB2 is coupled to a respective output of primary side control circuitry 30, the gate voltage thereof denoted signal VG2.

A first end of secondary winding 70 is coupled to the anode of a first diode D1 and a second end of secondary winding 70 is coupled to the anode of a second diode D1. The cathode of each of pair of diodes D1 is coupled to a first end of voltage divider 90 and a first end of capacitor C1, at output VO1. Output VO1 is coupled to an associated load (not shown). A second end of capacitor C1 is coupled to a common potential and a second end of voltage divider 90 is coupled to the common potential. A dividing node of voltage divider 90 is coupled to a respective input of primary side control circuitry 30 and a positive terminal of reference voltage source 100 is coupled to a respective input of primary side control circuitry 30. A return of reference voltage source 100 and a center tap of secondary winding 70 are each coupled to the common potential.

A first end of secondary winding 80 is coupled to the anode of a first diode D2 and a first end of capacitor C5. A second end of secondary winding 80 is coupled to the anode of a second diode D2 and a second end of capacitor C5. The cathode of each of pair of diodes D2 is coupled to the drain of NFET S1. The source of NFET S1 is coupled to the first end of capacitor C3 and a respective input of secondary side control circuitry 230, at output VO2. Output VO2 is coupled to an associated load (not shown). A second end of capacitor C3 and a center tap of secondary winding 80 are each coupled to the common potential. The gate of NFET S1 is coupled to a respective output of secondary side control circuitry 230, denoted signal VG3.

A first end of secondary winding 220 is coupled to the anode of a first diode D5 and a first end of capacitor C6. A second end of secondary winding 220 is coupled to the anode of a second diode D5 and a second end of capacitor C6. The cathode of each diode D5 is coupled to the first end of capacitor C4 and a respective input of secondary side control circuitry 230, at output VO3. Output VO3 is coupled to an associated load (not shown). The second end of capacitor C4 is coupled to the common potential. A center tap of secondary winding 220 is coupled to the drain of PFET S3 and the source of PFET S3 is coupled to the common potential. The gate of PFET S3 is coupled to a respective output of secondary side control circuitry 230, denoted signal VG4.

In operation, primary side control circuitry 30 is arranged to alternately open and close NFETs SB1 and SB2 via signals VG1, VG2 such that primary winding 60 is charged when NFET SB1 is closed and discharged when NFET SB2 is closed, as described above. Further as described above, the duty rate, or frequency, of signal VG1, VG2 are controlled responsive to output VO1 sensed via voltage divider 90 in relation to the voltage across reference voltage source 100.

An increase in duty cycle, or a decrease in frequency, causes an increase in the power output by each of secondary windings 80 and 220. Secondary side control circuitry 230 is arranged to alternately open and close each of NFET S1 and PFET S3 via respective signals VG3, VG4 so as to adjust the amount of power supplied from each of secondary windings 80, 220 to the respective one of outputs VO2, VO3. Particularly, secondary side control circuitry 230 is arranged to compare the voltage at output VO2 to a first predetermined value. In the event that the voltage at output VO2 is less than the first predetermined value, secondary side control circuitry 230 is arranged to increase the duty cycle of signal VG3 such that the on time of NFET S1 is increased. As a result, the voltage at output VO2 increases. In the event that the voltage at output VO2 is greater than the first predetermined value, secondary side control circuitry 230 is arranged to reduce the duty cycle of signal VG3 such that the on time of NFET S1 is reduced. As a result, the voltage at output VO2 decreases.

Transformer 50 is arranged to be large enough such that the leakage inductance of each secondary winding 80, 210 is large enough to allow buck mode regulation of the respective outputs VO2, VO3. Capacitors C1, C3, C4 are arranged to smooth the voltages at output VO1, VO2, VO3, respectively. In one embodiment, as described above, primary side control circuitry 30, switching circuit 40 and transformer 50 are arranged to control the voltage at output VO1 in an LLC configuration, i.e. the switching frequency of switching circuit 40 is adjusted so as to maintain the voltage at output VO1 at a desired value. In such an embodiment, capacitors C5, C6 are each arranged to form a resonant circuit with the leakage inductance of the respective one of secondary windings 80, 220 which adjusts the voltage gain of each output VO2, VO3.

Similarly, secondary side control circuitry 230 is arranged to compare the voltage at output VO3 to a first predetermined value. In the event that the voltage at output VO3 is less than the first predetermined value, secondary side control circuitry 230 is arranged to increase the duty cycle of signal VG4 such that the on time of PFET S3 is increased. As a result, the voltage at output VO3 increases. In the event that the voltage at output VO3 is greater than the first predetermined value, secondary side control circuitry 230 is arranged to reduce the duty cycle of signal VG4 such that the on time of PFET S3 is reduced. As a result, the voltage at output VO3 decreases.

Figure 2B:
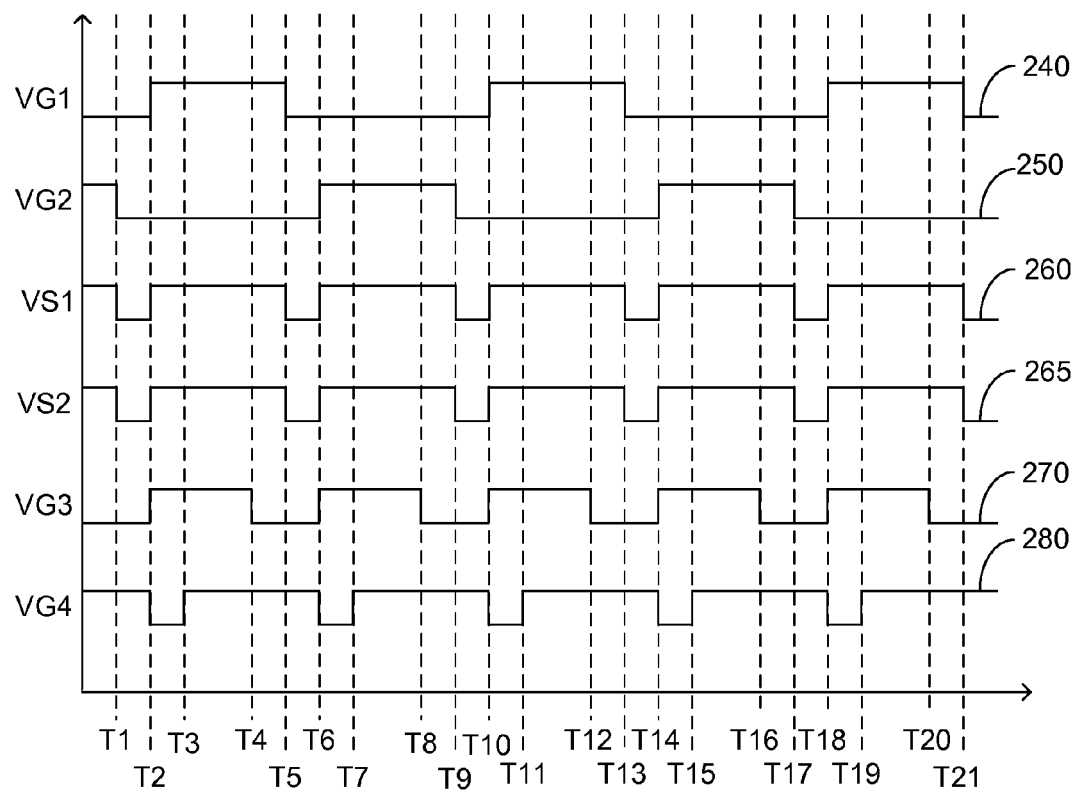
FIG. 2B illustrates voltage waveforms of the power converter of FIG. 2A synchronized with trailing edge modulation.
Figure 2C:
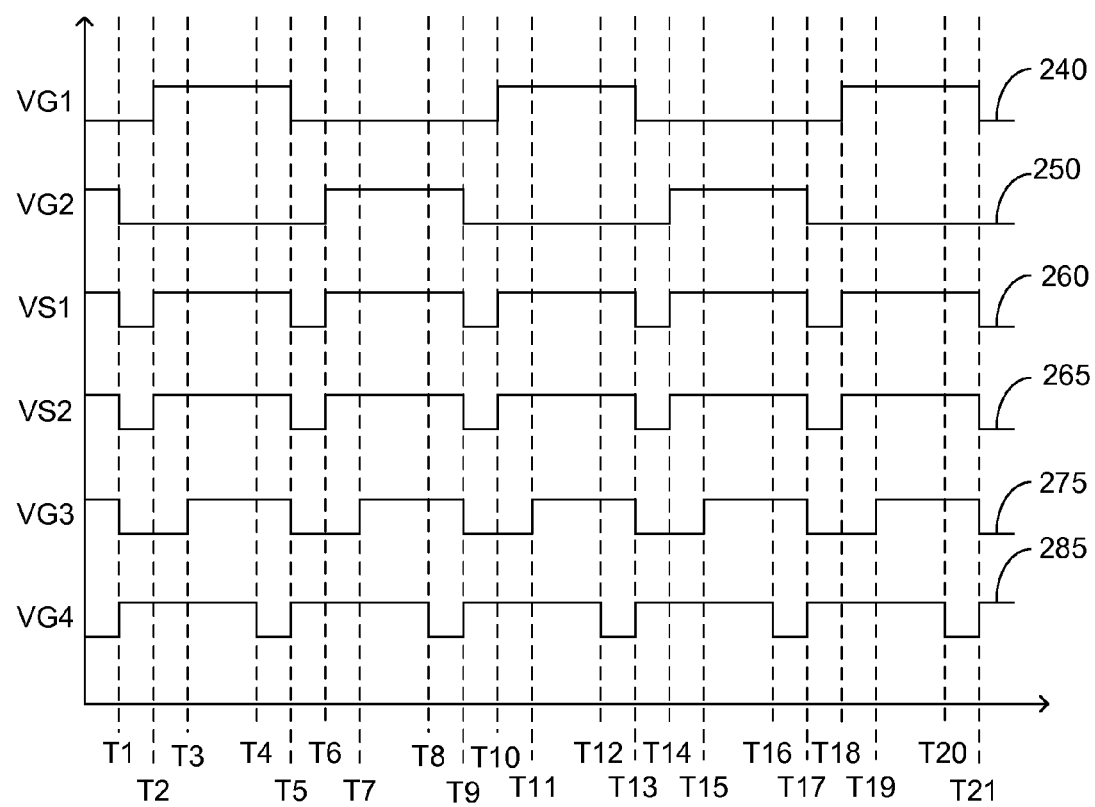
FIG. 2C illustrates voltage waveforms of the power converter of FIG. 2A synchronized with leading edge modulation.

Secondary side control circuitry 230 is arranged to control the switching of NFET S1 and PFET S3 to be synchronized with the switching of switching circuit 40. In one embodiment, as illustrated in FIG. 2B, the synchronization is with trailing edge modulation. In another embodiment, as illustrated in FIG. 2C, the synchronization is with leading edge modulation.

In the embodiment where the synchronization is with trailing edge modulation, as illustrated in FIG. 2B, graph 240 illustrates signal VG1 applied to the gate of NFET SB1 and graph 250 illustrates signal VG2 applied to the gate of NFET SB2. Graph 260 illustrates the rectified voltage at the cathodes of diodes D2, denoted VS1, and graph 265 illustrates the rectified voltage at the cathodes of diodes D5, denoted VS2. Graph 270 illustrates signal VG3 applied to the gate of NFET S1 and graph 280 illustrates signal VG4 applied to the gate of PFET S3. The x-axis of FIG. 2B represents time and the y-axis represents voltage in arbitrary units.

At time T1, primary side control circuitry 30 is arranged to output low values for each of signals VG1 and VG2, thereby opening both NFET SB1 and NFET SB2. As a result, voltages VS1 and VS2 are each zero. At time T2, signal VG1 is set to high and NFET SB1 is closed, thereby raising voltages VS1 and VS2 to the respective voltage levels. In one embodiment, the number of turns of secondary winding 220 equals the number of turns of secondary winding 80 thereby voltages VS1 and VS2 are equal. In another embodiment, the number of turns of secondary winding 220 is different than the number of turns of secondary winding 80 thereby voltages VS1 and VS2 differ accordingly. Additionally, secondary side control circuitry 230 is arranged to output a high value for signal VG3 and a low value for signal VG4, thereby closing NFET S1 and PFET S3, respectively. NFET S1 and PFET S3 are each thus closed when zero voltage is presented at the drain thereof, thereby reducing switching losses.

Capacitors C1, C3 and C4 are each charged from the respective one of secondary windings 70, 80 and 220. Particularly, the leakage inductance of each of secondary winding 70, 80 and 220 charges the respective capacitors C1, C3 and C4. At time T3, when the load of output VO3 has drawn sufficient power so that the value of output VO3 exceeds the respective predetermined value, secondary side control circuitry 230 is arranged to set signal VG4 to a high state, thereby opening PFET S3 and preventing any further charging of capacitor C4. Thus, the amount of time that power is supplied to output VO3 is less than the amount of time power is output at the secondary side of transformer 210. At time T4, when the load of output VO2 has drawn sufficient power so that the value of output VO2 exceeds the respective predetermined value, secondary side control circuitry 230 is arranged to set signal VG3 to a low value thereby opening NFET S1 and preventing any further charging of capacitor C3. Thus, the amount of time that power is supplied to output VO2 is less than the amount of time power is output at the secondary side of transformer 210. Additionally, the voltage at output VO2 is greater than the voltage at output VO3, since the on time of NFET S1 is greater than the on time of PFET S3, assuming equal turns for secondary windings 80, 220. At time T5, when the load of output VO1 has drawn sufficient power so that output VO1 sensed via voltage divider 90 exceeds reference voltage 100, primary side control circuitry 30 is arranged to set signal VG1 to a low value, thereby opening NFET SB1 and disconnecting the circuit of primary winding 60. As a result, charging of capacitor C1 is ceased and voltages VS1 and VS2 drop to zero.

At time T6, primary side control circuitry 30 is arranged to set signal VG2 to a high state, thereby closing NFET SB2 and raising voltages VS1 and VS2 to the respective voltage levels responsive to the respective turns ratios of the associated secondary windings 80, 220 in respect to the primary winding 60. Additionally, secondary side control circuitry 230 is arranged to set signal VG3 to a high state and signal VG4 to a low state, thereby closing NFET S1 and PFET S3, respectively. As described above, NFET S1 and PFET S3 are each closed when zero voltage is presented at the drain thereof, thereby reducing switching losses. At time T7, secondary side control circuitry 230 is arranged to set signal VG4 to a high state VG4, thereby opening PFET S3. At time T8, secondary side control circuitry 230 is arranged to set signal VG3 to a low state, thereby opening NFET S1 and preventing further charging of capacitor C3. At time T9, primary side control circuitry 30 is arranged to set signal VG2 to a low state, thereby opening NFET SB2 and disconnecting the circuit of primary winding 60. As a result, charging of capacitor C1 is ceased and voltages VS1 and VS2 drop to zero.

At time T10, primary side control circuitry 30 is arranged to set signal VG1 to high state, thereby closing NFET SB1 and raising voltages VS1 and VS2 to the respective voltage levels responsive to the respective turns ratios. Additionally, secondary side control circuitry 230 is arranged to set signal VG3 to a high state and to set signal VG4 to a low state, thereby closing NFET S1 and PFET S3, respectively. As described above, NFET S1 and PFET S3 are each closed when zero voltage is presented at the drain thereof, thereby reducing switching losses. At time T11, secondary side control circuitry 230 is arranged to set signal VG4 to a high state, thereby opening PFET S3. At time T12, secondary side control circuitry 230 is arranged to set signal VG3 to a low state VG3, thereby opening NFET S1 and preventing any further charging of capacitor C3. At time T13, primary side control circuitry 30 is arranged to set signal VG1 to a low state, thereby opening NFET SB1 and disconnecting the circuit of primary winding 60. As a result, charging of capacitor C1 is ceased and voltages VS1 and VS2 drop to zero.

At time T14, primary side control circuitry 30 is arranged to set signal VG2 to high state, thereby closing NFET SB2 and raising voltages VS1 and VS2 to the respective voltage levels responsive to the respective turns ratios. Additionally, secondary side control circuitry 230 is arranged to set signal VG3 to a high state and to set signal VG4 to a low state, thereby closing NFET S1 and PFET S3, respectively. As described above, NFET S1 and PFET S3 are each closed when zero voltage is presented at the drain thereof, thereby reducing switching losses. At time T15, secondary side control circuitry 230 is arranged to set signal VG4 to a level, thereby opening PFET S3. At time T16, secondary side control circuitry 230 is arranged to set signal VG3 to a low state, thereby opening NFET S1 and preventing any further charging of capacitor C3. At time T17, primary side control circuitry 30 is arranged to set signal VG2 to a low state, thereby opening NFET SB2 and disconnecting the circuit of primary winding 60. As a result, charging of capacitor C1 is ceased and voltages VS1 and VS2 drop to zero.

At time T18, primary side control circuitry 30 is arranged to set signal VG1 to a high state, thereby closing NFET SB1 and raising voltages VS1 and VS2 to the respective voltage levels responsive to the respective turns ratios. Additionally, secondary side control circuitry 230 is arranged to set signal VG2 to a high state and to set signal VG4 to a low state, thereby closing NFET S1 and PFET S3, respectively. As described above, NFET S1 and PFET S3 are each closed when zero voltage is presented at the drain thereof, thereby reducing switching losses. At time T19, secondary side control circuitry 230 is arranged to set signal VG4 to a high state, thereby opening PFET S3. At time T20, secondary side control circuitry 230 is arranged to set signal VG3 to a low state, thereby opening NFET S1 and preventing further charging of capacitor C3. At time T21, primary side control circuitry 30 is arranged to set signal VG1 to a low state, thereby opening NFET SB1 and disconnecting the circuit of primary winding 60. As a result, charging of capacitor C1 is ceased and voltages VS1 and VS2 drop to zero.

In the embodiment where the synchronization is with leading edge modulation, as illustrated in FIG. 2C, graph 240 illustrates signal VG1 applied to the gate of NFET SB1 and graph 250 illustrates signal VG2 applied to the gate of NFET SB2. Graph 260 illustrates voltage VS1 and graph 265 illustrates voltage VS2. Graph 275 illustrates signal VG3 applied to the gate of NFET S1 and graph 285 illustrates signal VG4 applied to the gate of PFET S3. The x-axis of FIG. 2C denotes time and the y-axis denotes voltage in arbitrary units.

At time T1, primary side control circuitry 30 is arranged to set signal VG2 to a low state, thereby opening NFET SB2. Additionally, signal VG1 is at a low state and thug NFET SB1 is open. As a result, voltages VS1 and VS2 are each zero. Additionally, secondary side control circuitry 230 is arranged to set signal VG3 to a low state and to set signal VG4 to a high state, thereby opening NFET S1 and PFET S3, respectively. NFET S1 and PFET S3 are each thus opened at zero current, thereby reducing turn off switching losses.

At time T2, signal VG1 is set to a high state and NFET SB1 is thus closed, thereby raising voltages VS1 and VS2 to the respective voltage levels. At time T3, secondary side control circuitry 230 is arranged to set signal VG3 to a high state, thereby closing NFET S1 and charging capacitor C3. At time T4, secondary side control circuitry 230 is arranged to set signal VG4 to a high state, thereby closing PFET S3 and charging capacitor C4. Thus, the duty cycle of NFET S1 is greater than the duty cycle of PFET S3.

At time T5, primary side control circuitry 30 is arranged to set signal VG1 to a low state, thereby opening NFET SB1 and disconnecting the circuit of primary winding 60. As a result, charging of capacitor C1 is ceased and voltages VS1 and VS2 drop to zero. Additionally, secondary side control circuitry 230 is arranged to set signal VG3 to a low state and to set signal VG4 to a high state, thereby opening NFET S1 and PFET S3, respectively. NFET S1 and PFET S3 are each thus opened when zero voltage is presented at the drain thereof, thereby reducing switching losses.

At time T6, primary side control circuitry 30 is arranged to set signal VG2 to a high state, thereby closing NFET SB2 and raising voltages VS1 and VS2 to the respective voltage levels responsive to the respective turns ratios. At time T7, secondary side control circuitry 230 is arranged to set signal VG3 to a high state, thereby closing NFET S1 and charging capacitor C3 as a result. At time T8, secondary side control circuitry 230 is arranged to set signal VG4 to a low state, thereby closing PFET S3 and charging capacitor C4 as a result. At time T9, primary side control circuitry 30 is arranged to set signal VG2 to a low state, thereby opening NFET SB2 and disconnecting the circuit of primary winding 60. As a result, charging of capacitor C1 is ceased and voltages VS1 and VS2 drop to zero. Additionally, secondary side control circuitry 230 is arranged to set signal VG3 to a low state and to set signal VG4 to a high state, thereby opening NFET S1 and PFET S3, respectively.

At time T10, signal VG1 is set to a high state and NFET SB1 is thus closed, thereby raising voltages VS1 and VS2 to the respective voltage levels responsive to the respective turns ratios. At time T11, secondary side control circuitry 230 is arranged to set signal VG3 to a high state, thereby closing NFET S1 and charging capacitor C3. At time T12, secondary side control circuitry 230 is arranged to set signal VG4 to a high state, thereby closing PFET S3 and charging capacitor C4. At time T13, primary side control circuitry 30 is arranged to set signal VG1 to a low state, thereby opening NFET SB1 and disconnecting the circuit of primary winding 60. As a result, charging of capacitor C1 is ceased and voltages VS1 and VS2 drop to zero. Additionally, secondary side control circuitry 230 is arranged to set signal VG3 to a low state and set signal VG4 to a high state, thereby opening NFET S1 and PFET S3, respectively. NFET S1 and PFET S3 are each thus opened when zero voltage is presented at the drain thereof, thereby reducing switching losses.

At time T14, primary side control circuitry 30 is arranged to set signal VG2 to a high state, thereby closing NFET SB2 and raising voltages VS1 and VS2 to the respective voltage levels determined responsive to the respective turns ratios. At time T15, secondary side control circuitry 230 is arranged to set signal VG3 to a high state, thereby closing NFET S1 and charging capacitor C3 as a result. At time T16, secondary side control circuitry 230 is arranged to set signal VG4 to a low state, thereby closing PFET S3 and charging capacitor C4 as a result. At time T17, primary side control circuitry 30 is arranged to set signal VG2 to a low state, thereby opening NFET SB2 and disconnecting the circuit of primary winding 60. As a result, charging of capacitor C1 is ceased and voltages VS1 and VS2 drop to zero. Additionally, secondary side control circuitry 230 is arranged to set signal VG3 to a low state and signal VG4 to a high state, thereby opening NFET S1 and PFET S3, respectively.

At time T18, signal VG1 is set to a high state by primary side control circuitry 30 NFET SB1 is closed, thereby raising voltages VS1 and VS2 to the respective voltage levels. At time T19, secondary side control circuitry 230 is arranged to set signal VG3 to a high state, thereby closing NFET S1 and charging capacitor C3. At time T20, secondary side control circuitry 230 is arranged to set signal VG4 to a high state, thereby closing PFET S3 and charging capacitor C4. At time T21, primary side control circuitry 30 is arranged to set signal VG1 to a low state, thereby opening NFET SB1 and disconnecting the circuit of primary winding 60. As a result, charging of capacitor C1 is ceased and voltages VS1 and VS2 drop to zero. Additionally, secondary side control circuitry 230 is arranged to set signal VG3 to a low state and to set signal VG4 to a high state, thereby opening NFET S1 and PFET S3, respectively. NFET S1 and PFET S3 are each thus opened when zero voltage is presented at the drain thereof, thereby reducing switching losses.

NFET S1 is described herein as being coupled between secondary winding 80 and output VO2, however this is not meant to be limiting in any way and in another embodiment NFET S1 is coupled between secondary winding 80 and the common potential. Similarly, PFET S3 is described herein as being coupled between secondary winding 220 and the common potential, however this is not meant to be limiting in any way and in another embodiment PFET S3 is coupled between secondary winding 220 and output VO3.

Multiple output power converter 200 is illustrated as comprising three outputs VO1, VO2 and VO3, however this is not meant to be limiting in any way. In another embodiment, multiple output power converter 200 is provided with less or more than three outputs, without exceeding the scope.

Figure 3A:
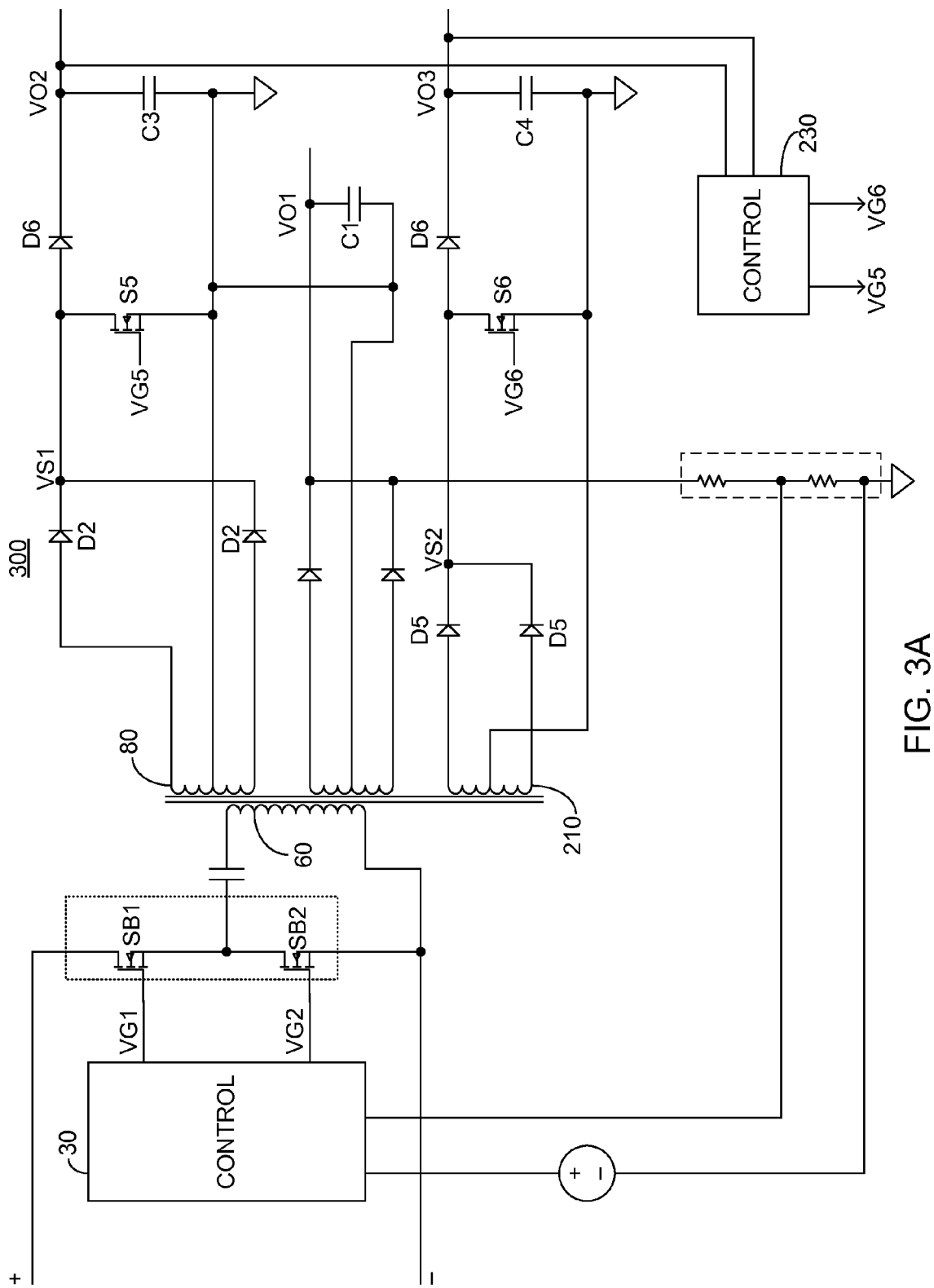
FIG. 3A illustrates a high level schematic diagram of a boost type multiple output synchronous power converter, according to certain embodiments.

FIG. 3A illustrates a high level schematic diagram of a boost type multiple output power converter 300, according to certain embodiments. Multiple output power converter 300 is in all respects similar to multiple output power converter 200 with the exception that NFET S1 is replaced with an electronically controlled switch S5 and PFET S3 is replaced with an electronically controlled switch S6. Additionally, a pair of unidirectional electronic valves D6 are provided and capacitors C5, C6 are not provided. In one embodiment, each of electronically controlled switches S5 and S6 is implemented as an NFET, and is described herein as such. In another embodiment, each unidirectional electronic valve D6 is implemented as a diode, and is described herein as such. The source of NFET S5 is coupled to the common potential and the gate of NFET S5 is coupled to a respective output of secondary side control circuitry 230, the signal output by secondary side control circuitry 230 denoted VG5. The drain of NFET S5 is coupled to the cathode of each of pair of diodes D2 and to the anode of a first diode D6. The cathode of first diode D6 is coupled to output VO2. The source of NFET S6 is coupled to the common potential and the gate of NFET S6 is coupled to a respective output of secondary side control circuitry 230, the signal output by secondary side control circuitry 230 denoted VG6. The drain of NFET S6 is coupled to the cathode of each of pair of diodes D5 and to the anode of a second diode D6. The cathode of second diode D6 is coupled to output VO3.

Figure 3B:
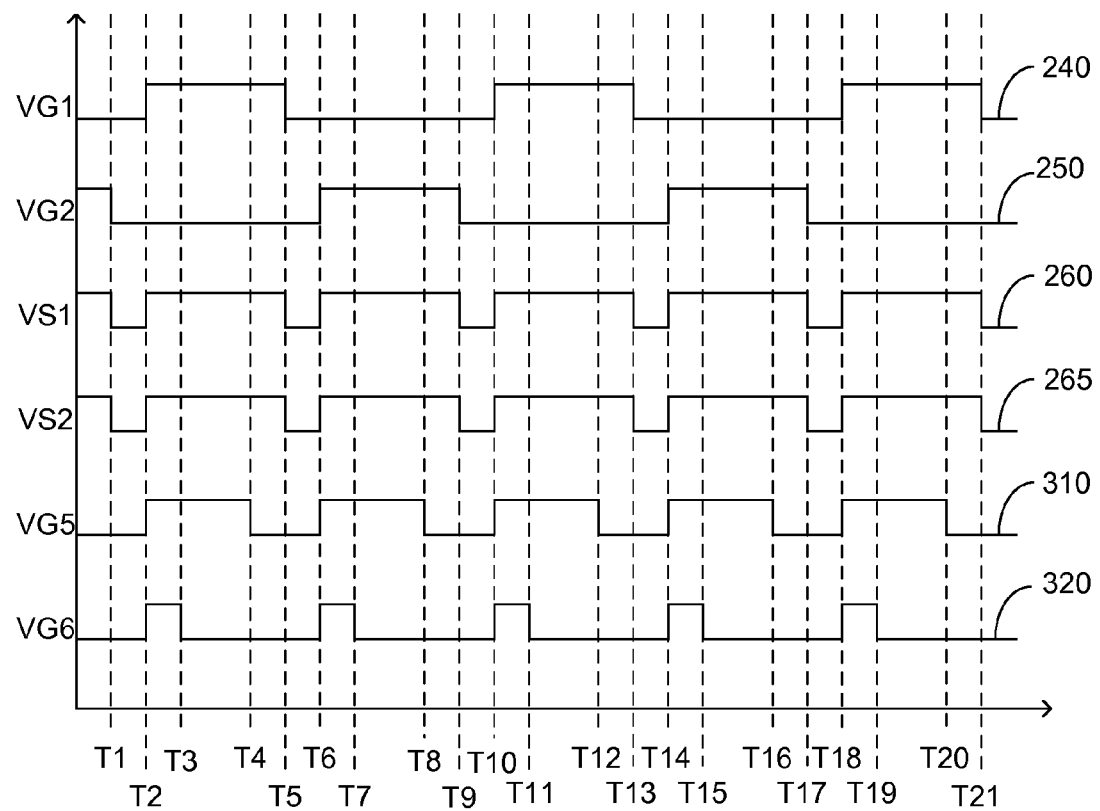
FIG. 3B illustrates voltage waveforms of the power converter of FIG. 3A.

The operation of multiple output power converter 300 is shown in FIG. 3B, where the x-axis represents time and the y-axis represents volts in arbitrary units. Graph 240 illustrates signal VG1 at the gate of NFET SB1 and graph 250 illustrates signal VG2 at the gate of NFET SB2. Graph 260 illustrates the rectified voltage at the cathodes of diodes D2, denoted VS1, and graph 265 illustrates the rectified voltage at the cathodes of diodes D5, denoted VS2. Graph 310 illustrates signal VG5 at the gate of NFET S5 and graph 320 illustrates signal VG6 at the gate of NFET S6.

At time T1, primary side control circuitry 30 is arranged to set signals VG1 and VG2 to respective low states, thereby opening both NFET SB1 and NFET SB2. As a result, voltages VS1 and VS2 are each zero. At time T2, primary side control circuitry 30 sets signal VG1 to a high state and NFET SB1 is thus closed, thereby raising voltages VS1 and VS2 to the respective voltage levels determined by the respective winding ratios and charging capacitor C1. Additionally, secondary side control circuitry 230 is arranged to set signal VG3 to a high state and to set signal VG4 to a high state, thereby closing NFETs S5 and S6, respectively. NFETs S5 and S6 are each thus closed when zero voltage is presented thereacross, thereby reducing switching losses. The leakage inductance of secondary winding 80 is thus charged in a boost arrangement through closed NFET S5 and the leakage inductance of secondary winding 210 is charged in a boost arrangement through closed NFET S6.

At time T3, secondary side control circuitry 230 is arranged to set signal VG6 to a low state, thereby opening NFET S6. As a result, the leakage inductance of secondary winding 210 freewheels through the respective diode D6 and charges capacitor C4. At time T4, secondary side control circuitry 230 is arranged to set signal VG5 to a low state, thereby opening NFET S5. As a result, the leakage inductance of secondary winding 80 freewheels through the respective diode D6 and charges capacitor C3. Thus, the duty cycle of signal VG6 is greater than the duty cycle of signal VG5. At time T5, primary side control circuitry 30 is arranged to set signal VG1 to a low state, thereby opening NFET SB1 and disconnecting the circuit of primary winding 60. As a result, charging of capacitor C1 is ceased and voltages VS1 and VS2 drop to zero thereby ceasing charging of capacitors C3, C4.

At time T6, primary side control circuitry 30 is arranged to set signal VG2 to a high state, thereby closing NFET SB2 and raising voltages VS1 and VS2 to the respective voltage levels responsive by the respective turns ratios. Additionally, secondary side control circuitry 230 is arranged to set signals VG5, VG6 to a high state thereby closing NFETs S5 and S6, respectively. As described above, NFETs S5 and S6 are each closed when zero voltage is presented thereacross, thereby reducing switching losses. At time T7, secondary side control circuitry 230 is arranged to set signal VG6 to a low state, thereby opening NFET S6 and charging capacitor C4. At time T8, secondary side control circuitry 230 is arranged to set signal VG5 to a low state, thereby opening NFET S5 and charging capacitor C3. Thus, the duty cycle of signal VG5 is greater than the duty cycle of signal VG6. At time T9, primary side control circuitry 30 is arranged to set signal VG2 to a low state thereby opening NFET SB2 and disconnecting the circuit of primary winding 60. As a result, charging of capacitor C1 is ceased and voltages VS1 and VS2 drop to zero thereby ceasing charging of capacitors C3, C4.

At time T10, primary side control circuitry 30 is arranged to set signal VG1 to a high state, thereby closing NFET SB1 and raising voltages VS1 and VS2 to the respective voltage levels responsive to the respective turns ratios. Additionally, secondary side control circuitry 230 is arranged to set signals VG5, VG6 to a high state thereby closing NFETs S5 and S6, respectively. As described above, NFETs S5 and S6 are each closed when zero voltage is presented thereacross, thereby reducing switching losses. At time T11, secondary side control circuitry 230 is arranged to set signal VG6 to low state thereby opening NFET S6 and charging capacitor C4. At time T12, secondary side control circuitry 230 is arranged to set signal VG5 to a low state, thereby opening NFET S5 and charging capacitor C3. At time T13, primary side control circuitry 30 is arranged to set signal VG1 to a low state, thereby opening NFET SB1 and disconnecting the circuit of primary winding 60. As a result, charging of capacitor C1 is ceased and voltages VS1 and VS2 drop to zero thereby ceasing charging of capacitors C3, C4.

At time T14, primary side control circuitry 30 is arranged to set signal VG2 to a high state, thereby closing NFET SB2 and raising voltages VS1 and VS2 to the respective voltage levels. Additionally, secondary side control circuitry 230 is arranged to set signals VG5, VG6 to a high state, thereby closing NFETs S5 and S6, respectively. As described above, NFETs S5 and S6 are each closed when zero voltage is presented thereacross, thereby reducing switching losses. At time T15, secondary side control circuitry 230 is arranged to set signal VG6 to a low state, thereby opening NFET S6 and charging capacitor C4. At time T16, secondary side control circuitry 230 is arranged to set signal VG5 to a low state, thereby opening NFET S5 and charging capacitor C3. At time T17, primary side control circuitry 30 is arranged to set signal VG2 to a low state, thereby opening NFET SB2 and disconnecting the circuit of primary winding 60. As a result, charging of capacitor C1 is ceased and voltages VS1 and VS2 drop to zero thereby ceasing charging of capacitors C3, C4.

At time T18, primary side control circuitry 30 is arranged to set signal VG1 to a high state, thereby closing NFET SB1 and raising voltages VS1 and VS2 to the respective voltage levels. Additionally, secondary side control circuitry 230 is arranged to set signals VG5, VG6 to a high state thereby closing NFETs S5 and S6, respectively. As described above, NFETs S5 and S6 are each closed when zero voltage is presented thereacross, thereby reducing switching losses. At time T19, secondary side control circuitry 230 is arranged to set signal VG6 to a low state, thereby opening NFET S6 and charging capacitor C4. At time T20, secondary side control circuitry 230 is arranged to set signal VG5 to a low state, thereby opening NFET S5 and charging capacitor C3. At time T21, primary side control circuitry 30 is arranged to set signal VG1 to a low state, thereby opening NFET SB1 and disconnecting the circuit of primary winding 60. As a result, charging of capacitor C1 is ceased and voltages VS1 and VS2 drop to zero thereby ceasing charging of capacitors C3, C4.

The operation of multiple output power converter 300 has been described where the switching of NFETs S5, S6 is synchronized with trailing edge modulation, however this is not meant to be limiting in any way. In another embodiment (not shown), the switching of NFETs S5, S6 is synchronized with leading edge modulation without exceeding the scope. Additionally, multiple output power converter 300 operates as a boost converter, therefore the peak of voltages VS1, VS2 are arranged to be lower the respective output voltages VO2, VO3.

Figure 4A:
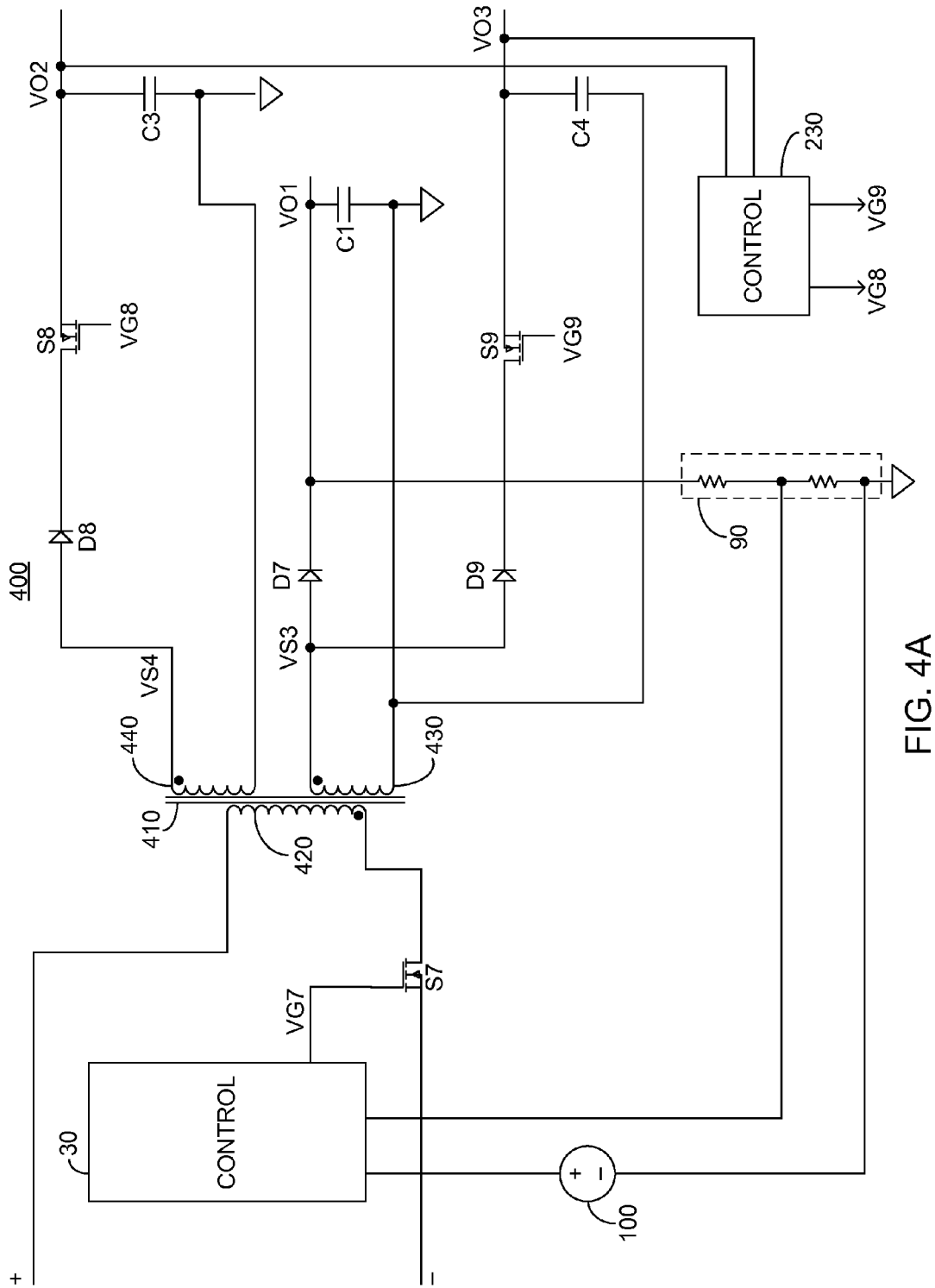
FIG. 4A illustrates a high level schematic diagram of a fly-back type multiple output synchronous power converter, according to certain embodiments.

FIG. 4A illustrates a high level schematic diagram of a fly-back type multiple output power converter 400, according to certain embodiments. Multiple output power converter 400 comprises: a primary side control circuitry 30; a plurality of electronically controlled switches S7, S8 and S9; a transformer 410, exhibiting a primary winding 420 and a plurality of secondary windings 430 and 440, each magnetically coupled to primary winding 420; a plurality of unidirectional electronic valves D7, D8 and D9; a plurality of capacitors C1, C3 and C4; a voltage divider 90; a reference voltage source 100; and a secondary side control circuitry 230. In one embodiment, each of electronically controlled switches S7, S8, S9 is implemented as an NFET, and is described herein as such. In another embodiment, each of unidirectional electronic valves D7, D8, D9 is implemented as a diode, and is described herein as such.

A first end of primary winding 420 of transformer 410 is coupled to a power terminal of a power source (not shown) and the second end of primary winding 420 is coupled to the drain of NFET S7, the polarity denoted by a dot. The gate of NFET S7 is coupled to a respective output of primary side control circuit 30, the signal thereof denoted VG7. The source of NFET S7 to the return of the power source.

A first end of secondary winding 430 is coupled to the anode of diode D7, the polarity denoted by a dot. The second end of secondary winding 430 is coupled to a common potential. The cathode of diode D7 is coupled to a first end of voltage divider 90 and a first end of capacitor C1, at output VO1. Output VO1 is coupled to an associated load (not shown). A second end of capacitor C1 is coupled to the common potential and a second end of voltage divider 90 is coupled to the common potential. A dividing node of voltage divider 90 is coupled to a respective input of primary side control circuitry 30 and a power terminal of reference voltage source 100 is coupled to a respective input of primary side control circuitry 30. A return of reference voltage source 100 is coupled to the common potential.

A first end of secondary winding 440 is coupled to the anode of diode D8, the polarity denoted by a dot. The second end of secondary winding 430 is coupled to the common potential. The cathode of diode D8 is coupled to the drain of NFET S8 and the gate of NFET S8 is coupled to a respective output of secondary side control circuitry 230, the signal thereof denoted VG8. The source of NFET S8 is coupled to a respective input of secondary side control circuitry 230 and a first end of capacitor C3, at output VO2. Output VO2 is coupled to an associated load (not shown). A second end of capacitor C3 is coupled to the common potential.

The anode of diode D9 is coupled to the anode of diode D7 and the cathode of diode D9 is coupled to the drain of NFET S9. The gate of NFET S9 is coupled to a respective output of secondary side control circuitry 230, the signal thereof denoted VG9. The source of NFET S9 is coupled to a respective input of secondary side control circuitry 230 and a first end of capacitor C4, at output VO3. Output VO3 is coupled to an associated load (not shown). A second end of capacitor C4 is coupled to the common potential.

In operation, primary side control circuitry 30 is arranged to alternately open and close NFET S7 via signal VG7. When NFET S7 is closed, primary winding 420 of transformer 410 is charged. When NFET S7 is open, the energy of primary winding 420 flies back to secondary windings 430 and 440, thereby raising the voltage at the output thereof, the voltage at the output of secondary windings 430, 440 denoted respectively VS3, VS5. In one embodiment, the regulated voltage at output VO1 is greater than the regulated voltage at output VO2, the regulated voltage at output VO2 being greater than the regulated voltage at output VO3. As a result, during the fly-back stage power is supplied first to output VO3, voltage VS3 being clamped at a diode drop greater than the regulated voltage value of output VO3 by diode D9. After output VO3 receives the necessary amount of electrical energy so that voltage VO3 rises above a respective predetermined limit, secondary side control circuitry 230 open NFET S9 via signal VG9 and voltage VS5 rises and power is then supplied to output VO2, voltage VS5 being clamped at a diode drop greater than the regulated voltage value of output VO2 by diode D8. After output VO2 receives the necessary amount of electrical energy so that voltage VO3 rises above a respective predetermined limit, secondary side control circuitry 230 open NFET S8 via signal VG8, and voltage VS3 rises to the maximum value and power is supplied to output VO1. When output VO1 receives the necessary amount of electrical energy so that voltage VO1 rises above a predetermined limit set via reference voltage source 110 and divider network 90, primary side control circuitry 30 closes NFET S7 via signal VG7 and primary winding 420 is again charged.

Figure 4B:
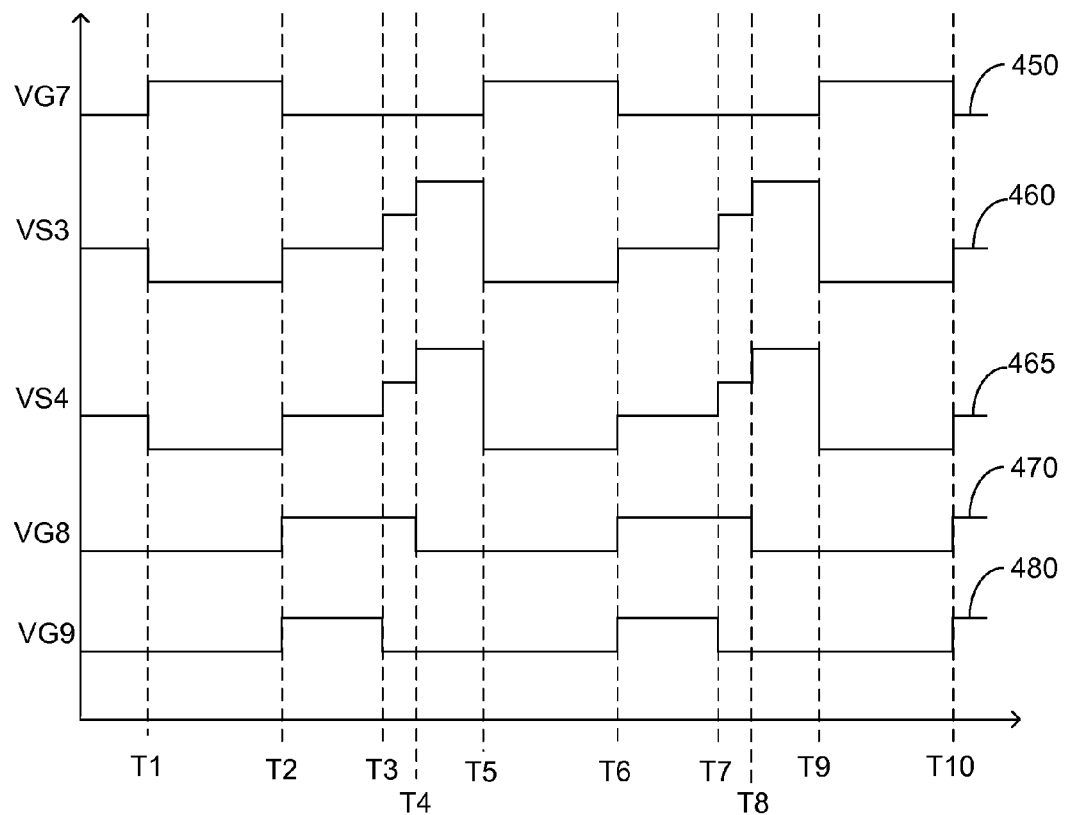
FIG. 4B illustrates voltage waveforms of the power converter of FIG. 4A.

The operation of multiple output power converter 400 is shown in FIG. 4B, where the x-axis represents time and the y-axis represents volts in arbitrary units. Graph 450 illustrates signal VG7 applied to the gate of NFET S7, graph 460 illustrates voltage VS3, graph 465 illustrates voltage VS5, graph 470 illustrates signal VG8 applied to the gate of NFET S8 and graph 480 illustrates signal VG9 applied to the gate of NFET S9.

At time T1, primary side control circuitry 30 is arranged to set signal VG7 to a high state, thereby closing NFET S7 and charging primary winding 420. When primary winding 420 is charging, voltages VS3, VS5 are each zero due to the reversed polarity of primary winding 420 and secondary windings 430, 440. At time T2, primary side control circuitry 30 is arranged to set signal VG7 to a low state. NFET S7 is thus opened and the power stored in primary winding 420 flies back to secondary windings 430, 440. Additionally, secondary side control circuitry 230 is arranged to set signals VG8, VG9 to high states, thereby closing NFETs S8, S9. Voltages VS3, VS5 each rise to a diode drop above the regulated voltage value of output VO3, which as described above is lowest voltage of outputs VO1, VO2, VO3. The load of output VO3 draws electrical energy from secondary winding 430, thereby clamping voltage VS5 to a value below the voltage value at outputs VO1 and VO2. NFETs S8, S9 are each closed when zero voltage is presented at the drain thereof, thereby reducing switching losses as described above in relation to multiple output power converter 200.

At time T3, secondary side control circuitry 230 sets signal VG9 to a low state, thereby opening NFET S9 and ceasing charging of capacitor C4. As a result, voltage VS5 is no longer clamped to output VO3 and rises to a diode drop above the regulated voltage value of output VO2. The load of output VO2 draws electrical energy from secondary winding 440, thereby clamping voltage VS3 to a value below the voltage value at output VO1 and not allowing capacitor C1 to charge.

At time T4, secondary side control circuitry 240 sets signal VG8 to a low state, thereby opening NFET S8 and ceasing the charging of capacitor C3. As a result, voltage VS3 is no longer clamped to output VO3 and rises to a diode drop above the regulated voltage value of output VO1, thereby charging capacitor C1 and providing power to the associated load.

At time T5, when sufficient electrical energy has been supplied to the load of output VO1, as sensed by primary side control circuitry 30 via divider circuitry 90 and responsive to reference voltage source 100, primary side control circuitry 30 is arranged to set signal VG7 to a high state so as to close NFET S7 and charge primary winding 420. When primary winding 420 is charging, voltages VS3, VS5 are each zero due to the reversed polarity of primary winding 420 and secondary windings 430, 440. At time T6, primary side control circuitry 30 is arranged to set signal VG7 to a low state. NFET S7 is thus opened and the power stored in primary winding 420 flies back to secondary windings 430, 440. Additionally, secondary side control circuitry 230 is arranged to set signal VG8, VG9 to respective high state, thereby closing NFETs S8, S9. Voltages VS3, VS5 each rise to a diode drop above the regulated voltage value of output VO3, as described above. The load of output VO3 draws electrical energy from secondary winding 430, thereby clamping voltage VS5. NFETs S8, S9 are each closed when zero voltage is presented at the drain thereof, thereby reducing switching losses as described above in relation to multiple output power converter 200.

At time T7, secondary side control circuitry 230 sets signal VG9 to a low state, thereby opening NFET S9 and ceasing charging of capacitor C4. As a result, voltage VS5 is no longer clamped to output VO3 and rises to a diode drop above the regulated voltage value of output VO2. The load of output VO2 draws electrical energy from secondary winding 440, thereby clamping voltage VS3 to a value less than the voltage value at output VO1 and not allowing capacitor C1 to charge due to the operation of diode D7.

At time T8, secondary side control circuitry 240 set signal VG8 to a low state, thereby opening NFET S8 and ceasing the charging of capacitor C3. As a result, voltage VS3 is no longer clamped to output VO3 and rises to a diode drop above the regulated voltage value of output VO1, thereby charging capacitor C1 via diode D7 and providing electrical energy to the associated load.

At time T9, primary side control circuitry 30 is arranged to set signal VG7 to a high state, thereby closing NFET S7 and charging primary winding 420. At time T10, primary side control circuitry 30 is arranged to set signal VG7 to a low state. NFET S7 is thus opened and the energy stored in primary winding 420 flies back to secondary windings 430, 440. Additionally, secondary side control circuitry 230 is arranged to set signals VG8, VG9 to respective high state, thereby closing NFETs S8, S9.

Figure 5A:
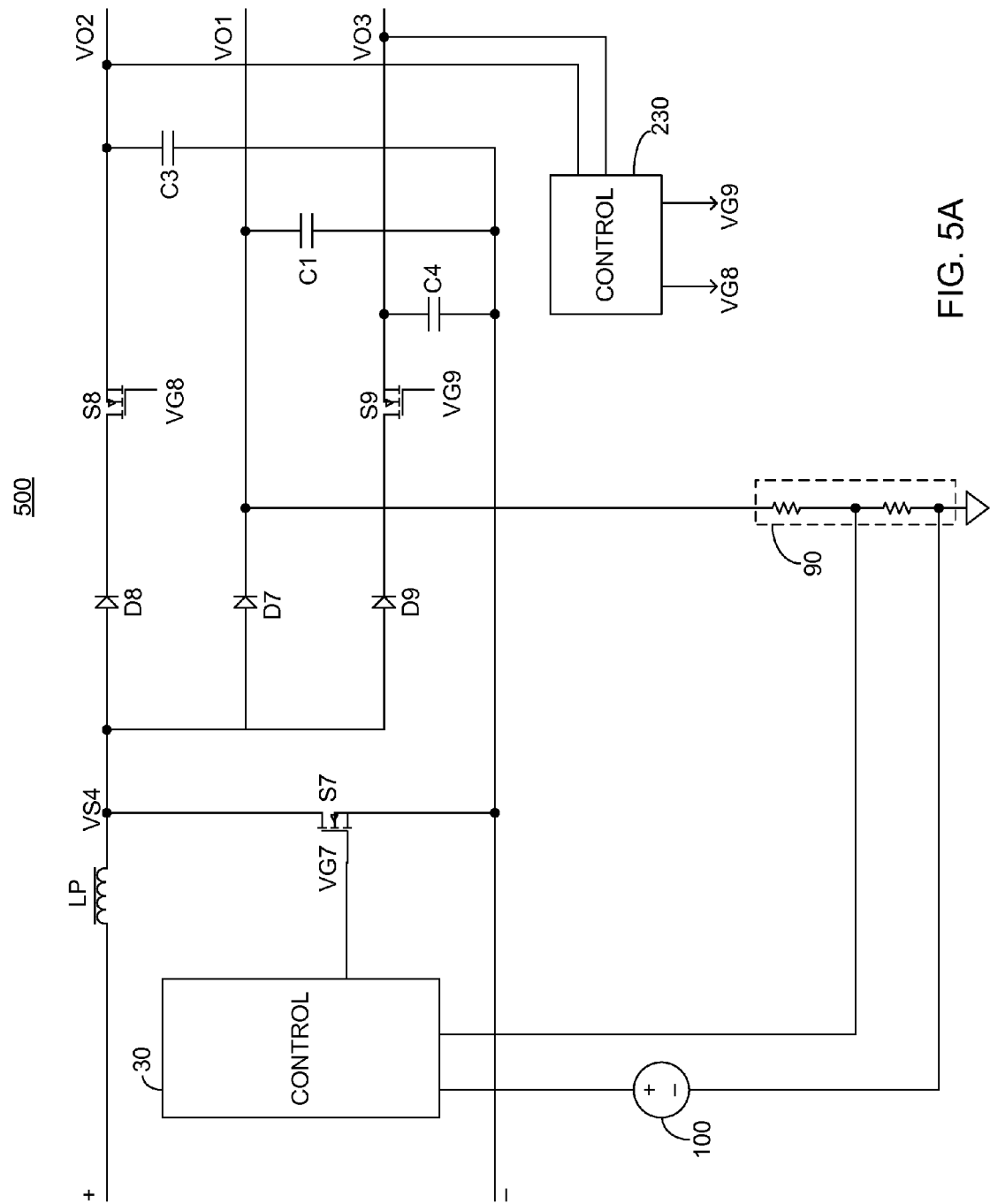
FIG. 5A illustrates a high level schematic diagram of a non-isolated multiple output synchronous power converter, according to certain embodiments.

FIG. 5A illustrates a high level schematic diagram of a multiple output power converter 500, according to certain embodiments. Multiple output power converter 500 comprises: a primary side control circuitry 30; a primary side inductance element LP; a plurality of NFETs S7, S8 and S9; a plurality of diodes D7, D8 and D9; a plurality of capacitors C1, C3 and C4; a secondary side control circuitry 230; a voltage divider 90; and a reference voltage source 100. In one embodiment, primary side inductance element LP is implemented as an inductor, and is described herein as such.

A first end of primary side inductor LP is coupled to a power terminal of a power source (not shown) and the second end of primary side inductor LP is coupled to the drain of NFET S7 and the anode of each of diodes D7, D8 and D9. The gate of NFET S7 is coupled to an output of primary side control circuitry 30, the signal thereof denoted VG7, and the source of NFET S7 is coupled to the return of the power source.

The cathode of diode D7 is coupled to a first end of voltage divider 90 and a first end of capacitor C1, at output VO1. Output VO1 is coupled to an associated load (not shown). A second end of capacitor C1 is coupled to the common potential and a second end of voltage divider 90 is coupled to the common potential. A dividing node of voltage divider 90 is coupled to a respective input of primary side control circuitry 30 and a power terminal of reference voltage source 100 is coupled to a respective input of primary side control circuitry 30. A return of reference voltage source 100 is coupled to the common potential.

The cathode of diode D8 is coupled to the drain of NFET S8 and the gate of NFET S8 is coupled to a respective output of secondary side control circuitry 230, the signal thereof denoted VG8. The source of NFET S8 is coupled to a respective input of secondary side control circuitry 230 and a first end of capacitor C3, at output VO2. Output VO2 is coupled to an associated load (not shown). A second end of capacitor C3 is coupled to the common potential.

The cathode of diode D9 is coupled to the drain of NFET S9. The gate of NFET S9 is coupled to a respective output of secondary side control circuitry 230, the signal thereof denoted VG9. The source of NFET S9 is coupled to a respective input of secondary side control circuitry 230 and a first end of capacitor C4, at output VO3. Output VO3 is coupled to an associated load (not shown). A second end of capacitor C4 is coupled to the common potential.

In operation, primary side control circuitry 30 is arranged to alternately open and close NFET S7 via signal VG7. When NFET S7 is closed, primary side inductor LP is charged. When NFET S7 is open, the energy of primary winding 420 freewheels through diodes D7, D8 and D9 to the respective outputs VO1, VO2 and VO3, the voltage at the drain of NFET S7 denoted VS5. NFETs S8 and S9 are alternately opened and closed to regulate the voltage of outputs VO2 and VO3, respectively. As described above in relation to multiple output power converter 400, electrical energy is first supplied to output VO3. When sufficient electrical energy is received by the load of output VO3 so that secondary control circuitry 230 sets signal VG9 to open NFET S9, voltage VS5 rises and power is then supplied to output VO2. When sufficient power is received by the load of output VO2 so that secondary control circuitry 230 sets signal VG8 to open NFET S8, voltage VS5 rises and power is then supplied to output VO1.

Figure 5B:
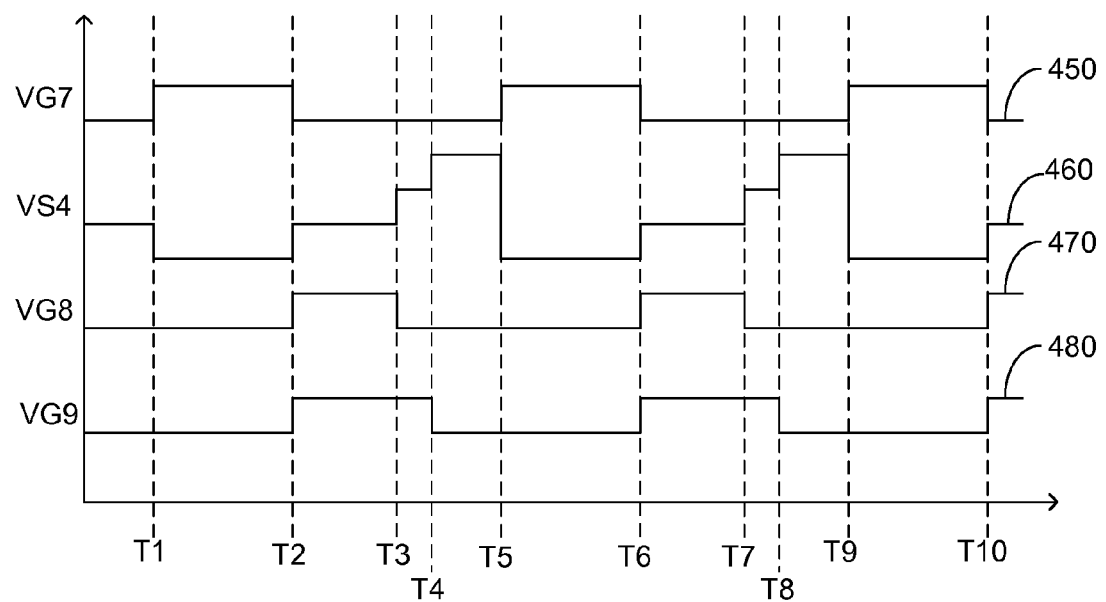
FIG. 5B illustrates voltage waveforms of the power converter of FIG. 5A.

The operation of multiple output power converter 500 is shown in FIG. 5B, where the x-axis represents time and the y-axis represents volts in arbitrary units. Graph 450 illustrates signal VG7 applied to the gate of NFET S7, graph 460 illustrates voltage VS5, graph 470 illustrates signal VG8 applied to the gate of NFET S8 and graph 480 illustrates signal VG9 applied to the gate of NFET S9.

At time T1, primary side control circuitry 30 is arranged to set signal VG7 to a high state, thereby closing NFET S7 and charging primary side inductor LP. When primary side inductor LP is charging, voltage VS5 is clamped to zero by NFET S7. At time T2, primary side control circuitry 30 is arranged to set signal VG7 to a low state. Additionally, secondary side control circuitry 230 is arranged to set signals VG8, VG9 to respective high states, thereby closing NFETs S8, S9. Voltage VS5 rises to a diode drop above the regulated voltage value of output VO3, which as described above in relation to multiple output power converter 400 is the lowest voltage of outputs VO1, VO2, VO3. The load of output VO3 draws electrical energy from primary side inductor LP, thereby clamping voltage VS5 to a value less than the voltage value at outputs VO1 and VO2. NFETs S8, S9 are each closed when zero voltage is presented at the drain thereof, thereby reducing switching losses as described above in relation to multiple output power converter 200.

At time T3, secondary side control circuitry 230 sets signal VG9 to a low state, thereby opening NFET S9 and ceasing charging of capacitor C4. As a result, voltage VS5 is no longer clamped to output VO3 and rises to a diode drop above the regulated voltage value of output VO2. The load of output VO2 draws current from primary side inductor LP, thereby clamping voltage VS5 to a value less than the voltage value at output VO1 and not allowing capacitor C1 to charge.

At time T4, secondary side control circuitry 240 outputs sets signal VG8 to a low state, thereby opening NFET S8 and ceasing the charging of capacitor C3. As a result, voltage VS5 is no longer clamped to output VO3 and rises to a diode drop above the regulated voltage value of output VO1, thereby charging capacitor C1 and providing power to the associated load.

At time T5, when sufficient electrical energy has been supplied to the load of output VO1, responsive to output VO1 rising to a predetermined value, primary side control circuitry 30 is arranged to output set signal VG7 to a high state, thereby closing NFET S7 and charging primary side inductor LP. At time T6, primary side control circuitry 30 is arranged to set signal VG7 to a low state. Additionally, secondary side control circuitry 230 is arranged to set signals VG8, VG9 to respective high states, thereby closing NFETs S8, S9. Voltage VS5 rises to a diode drop above the regulated voltage value of output VO3. The load of output VO3 draws current from primary side inductor LP, thereby clamping voltage VS5. NFETs S8, S9 are each closed when zero voltage is presented at the drain thereof, thereby reducing switching losses as described above in relation to multiple output power converter 200.

At time T7, secondary side control circuitry 230 sets signal VG9 to a low state, thereby opening NFET S9 and ceasing charging of capacitor C4. As a result, voltage VS5 is no longer clamped to output VO3 and rises to a diode drop above the regulated voltage value of output VO2. The load of output VO2 draws electrical energy from primary side inductor LP, thereby clamping voltage VS5 to a value less than the voltage value at output VO1 and not allowing capacitor C1 to charge due to the action of diode D7.

At time T8, secondary side control circuitry 240 sets signal VG8 to a low state, thereby opening NFET S8 and ceasing the charging of capacitor C3. As a result, voltage VS5 is no longer clamped to output VO3 and rises to a diode drop above the regulated voltage value of output VO1, thereby charging capacitor C1 and providing power to the associated load.

At time T9, when sufficient electrical energy has been supplied to the load of output VO1 so that it has risen to a respective predetermined value, primary side control circuitry 30 is arranged to set signal VG7 to a high state, thereby closing NFET S7 and charging primary side inductor LP. At time T10, primary side control circuitry 30 is arranged to set signal VG7 to a low state. Additionally, secondary side control circuitry 230 is arranged to set signals VG8, VG9 to high states, thereby closing NFETs S8, S9. Voltage VS5 rises to a diode drop above the regulated voltage value of output VO3. The load of output VO3 draws electrical energy from primary side inductor LP, thereby clamping voltage VS5. NFETs S8, S9 are each closed when zero voltage is presented at the drain thereof, thereby reducing switching losses as described above in relation to multiple output power converter 200.

FIG. 6 illustrates a high level flow chart of a synchronous power conversion method, according to certain embodiments. In stage 1000, a switching circuit is switched between a plurality of states. Responsive to a first state of the switching circuit, power is provided from a power source to a primary side of an inductance element. Responsive to a second state of the switching circuit, different than the first state, power is not provided to the primary side of the inductance element from the power source. Optionally, the switching circuit comprises a bridge circuit. In the first state of the bridge circuit, the primary side of the inductance element is coupled to the power source and power is supplied to the primary side. In the second state of the bridge circuit, the primary side of the inductance element is not coupled to the power source. In a third state of the bridge circuit, the primary side of the inductance element is coupled to the return of the power supply and power is discharged from the primary side.

In stage 1010, responsive to the received power of stage 1000, a function of the received power is output at a secondary side of the inductance element of stage 1000. In the embodiment where the switching circuit of stage 1000 comprises a bridge circuit, the function of power is output when the bridge circuit is in any of the first state and the second state.

In stage 1020, the switching of the switching circuit of stage 1000 is arranged such that the voltage at a first output is maintained at a predetermined level. The first output is non-switchably coupled to the secondary side of the inductance element. In one embodiment, the duty cycle of the switching circuit is adjusted to maintain the voltage level at the first output. In another embodiment, the switching frequency of the switching circuit is adjusted to maintain the voltage level at the first output.

In stage 1030, a first electronically controlled switch is alternately switched between a closed state and an open state. Responsive to a first of the closed state and open state of the first electronically controlled switch, a first portion of the power output from the secondary side of the inductance element of stage 1010 is provided to a second output, different than the first output of stage 1020. Responsive to a second of the closed state and open state of the first electronically controlled switch, the first power of the power output from the secondary side of the inductance element of stage 1010 is not provided to the second output. The switching of the first electronically controlled switch is synchronized with the switching of the switching circuit of stage 1000. Additionally, the amount of time the first portion of power is received by the second output is less than the amount of time the function of power of stage 1010 is output at the secondary side of the inductance element.

In optional stage 1040, the synchronization of stage 1030 is one of trailing edge modulation and leading edge modulation. Particularly, in one embodiment the switching of the first electronically controlled switch into the first state is synchronized with the switching of the switching circuit into the first state. In another embodiment, the switching of the first electronically controlled switch into the second state is synchronized with the switching of the switching circuit into the second state.

In optional stage 1050, an inductor is not coupled between the second output and the secondary side of the inductance element of stage 1010. Particularly, the inductance of the inductance element of stage 1000 is arranged to be large enough such that additional inductors in the secondary line outputs are unnecessary.

In optional stage 1060, a second electronically controlled switch is alternately switched between a closed state and an open state. Responsive to a first of the closed state and open state of the second electronically controlled switch, a second portion of the power output from the secondary side of the inductance element of stage 1010 is provided to a third output, different than the first output of stage 1020 and the second output of stage 1030. Responsive to a second of the closed state and open state of the second electronically controlled switch, the second portion of the power output from the secondary side of the inductance element of stage 1010 is not provided to the third output. The switching of the second electronically controlled switch is synchronized with the switching of the switching circuit of stage 1000. Additionally, the amount of time the first portion of power is received by the third output is less than the amount of time the function of power of stage 1010 is output at the secondary side of the inductance element.

In optional stage 1070, the duty cycle of the second electronically controlled switch of optional stage 1060 is less than the duty cycle of the first electronically controlled switch of stage 1030. In optional stage 1080, the inductance element of stage 1000 comprises one of: a transformer, the primary side of the inductance element comprising a primary winding of the transformer and the secondary side of the inductance element comprising a plurality of secondary windings each magnetically coupled to the primary winding; and an inductor, the primary side of the inductance element comprising a first end of the inductor and the secondary side of the inductance element comprising a second end of the inductor, opposing the first end.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

The invention claimed is:

1. A multiple output synchronous power converter comprising:
   a control circuitry;
   an inductance element having a primary side and a secondary side;
   a switching circuit, said inductance element arranged, responsive to said switching circuit, to receive power at said primary side from a power source, and said inductance element further arranged, responsive to said received power at said primary side, to output at said secondary side a function of said received power;
   a first output non-switchably coupled to said secondary side of said inductance element, said control circuitry arranged to switch said switching circuit so as to maintain said first output at a predetermined level;
   a second output, different than said first output, arranged to receive electrical energy from said secondary side of said inductance element; and
   a first electronically controlled switch, said first electronically controlled switch arranged to be alternately in a closed state and an open state, responsive to said control circuitry,
   wherein responsive to said first electronically controlled switch being in a first of said closed state and said open state, said second output is arranged to receive a first portion of said power output from said secondary side of said inductance element,
   wherein responsive to said first electronically controlled switch being in a second of said closed state and said open state, said second output is arranged to not receive said first portion of power,
   wherein said control circuitry is arranged to alternately set said first electronically controlled switch in one of said first and second of said closed state and said open state in synchronization with said switching of said switching circuit,
   wherein the amount of time said first portion of power is received by said second output is less than the amount of time said function of power is output at said secondary side of said inductance element, and
   wherein an inductor is not coupled between said second output and said secondary side of said inductance element.

2. The power converter of claim 1, wherein said synchronization comprises one of trailing edge modulation and leading edge modulation.

3. The power converter of claim 1, further comprising:
   a third output, different than said first output and said second output; and
   a second electronically controlled switch, said second electronically controlled switch arranged to be alternately in a closed state and an open state, responsive to said control circuitry,
   wherein responsive to said second electronically controlled switch being in a first of said closed state and said open state, said third output is arranged to receive a second portion of said power output from said secondary side of said inductance element,
   wherein responsive to said second electronically controlled switch being in a second of said closed state and said open state, said third output is arranged to not receive said second portion of power,
   wherein said control circuitry is arranged to alternately set said second electronically controlled switch in one of said first and said second of said closed state and said open state in synchronization with said switching of said switching circuit, and
   wherein the amount of time said second portion of power is received by said third output is less than the amount of time said function of power is output at said secondary side of said inductance element.

4. The power converter of claim 3, wherein the duty cycle of said second electronically controlled switch is less than the duty cycle of said first electronically controlled switch.

5. The power converter of claim 3, wherein said arrangement of said second output to receive said first portion of power is further responsive to said second electronically controlled switch being in said second of said closed state and said open state, and
   wherein said first output is arranged to receive a third portion of said power output from said secondary side of said inductance element responsive to said first electronically controlled switch being in said second of said closed state and said open state and said second electronically controlled switch being in said second of said closed state and said open state.

6. The power converter of claim 1, wherein said inductance element comprises one of:
   a transformer, said primary side comprising a primary winding and said secondary side comprising a plurality of secondary windings, each magnetically coupled to said primary winding; and
   an inductor, said primary side comprising a first end of said inductor and said secondary side comprising a second end of said inductor, opposing said first end.

7. A synchronous power conversion method, the method comprising:
   switching a switching circuit between a plurality of states;
   providing power to a primary side of an inductance element responsive to a first state of the switching circuit;
   not providing power to the primary side of the inductance element responsive to a second state of the switching circuit;
   responsive to said received power at the primary side of the inductance element, outputting at a secondary side of the inductance element a function of said received power;
   maintain voltage of a first output at a predetermined level, responsive to said switching of the switching circuit, the first output non-switchably coupled to the secondary side of the inductance element;
   alternately switching a first electronically controlled switch between a closed state and an open state;
   responsive to a first of said closed state and said open state of the first electronically controlled switch, providing a first portion of said power output from the secondary side of the inductance element to a second output, different than the first output; and
   responsive to a second of said closed state and said open state of the first electronically controlled switch, not providing said first portion of power,
   wherein said switching the first electronically controlled switch into one of said first and said second of said closed state and said open state is in synchronization with said switching of the switching circuit,
   wherein the amount of time said first portion of power is received by the second output is less than the amount of time said function of power is output at the secondary side of the inductance element, and wherein an inductor is not coupled between the second output and the secondary side of the inductance element.

8. The method of claim 7, wherein said synchronization comprises one of trailing edge modulation and leading edge modulation.

9. The method of claim 7, further comprising:
alternately switching a second electronically controlled switch between a closed state and an open state;
responsive to a first of said closed state and said open state of the second electronically controlled switch, providing a second portion of said power output from the secondary side of the inductance element to a third output, different than the first output and the second output; and
responsive to a second of said closed state and said open state of the second electronically controlled switch, not providing said second portion of power,
wherein said switching the second electronically controlled switch into one of said first and said second of said closed state and said open state is in synchronization with said switching of the switching circuit, and
wherein the amount of time said second portion of power is received by the second output is less than the amount of time said function of power is output at the secondary side of the inductance element.

10. The method of claim 9, wherein the duty cycle of the second electronically controlled switch is less than the duty cycle of the first electronically controlled switch.

11. The method of claim 9, wherein said providing said first portion of power to the second output is further responsive to the second electronically controlled switch being in said second of said closed state and said open state, and
wherein the method further comprises providing a third portion of said power output from the secondary side of the inductance element to the first output responsive to the first electronically controlled switch being in said second of said closed state and said open state and the second electronically controlled switch being in said second of said closed state and said open state.

12. The method of claim 7, wherein the inductance element comprises one of:
a transformer, the primary side comprising a primary winding and the secondary side comprising a plurality of secondary windings, each magnetically coupled to the primary winding; and
an inductor, the primary side comprising a first end of the inductor and the secondary side comprising a second end of the inductor, opposing the first end.

* * * * *